United States Patent [19]
Vaithyanathan et al.

[11] Patent Number: 5,819,258
[45] Date of Patent: Oct. 6, 1998

[54] METHOD AND APPARATUS FOR AUTOMATICALLY GENERATING HIERARCHICAL CATEGORIES FROM LARGE DOCUMENT COLLECTIONS

[75] Inventors: Shivakumar Vaithyanathan, San Jose, Calif.; Robert Travis, Concord; Mayank Prakash, Acton, both of Mass.

[73] Assignee: Digital Equipment Corporation, Maynard, Mass.

[21] Appl. No.: 847,734

[22] Filed: Mar. 7, 1997

[51] Int. Cl.$^6$ .................................................. G06F 17/30
[52] U.S. Cl. ............................. 707/2; 707/5; 707/7; 707/8
[58] Field of Search ..................... 707/5, 7, 8, 2

[56] References Cited

U.S. PATENT DOCUMENTS

| | | | |
|---|---|---|---|
| 4,908,865 | 3/1990 | Doddington et al. | 704/241 |
| 4,918,614 | 4/1990 | Modarres et al. | 364/490 |
| 5,442,778 | 8/1995 | Pedersen et al. | 707/5 |
| 5,544,066 | 8/1996 | Rostoker et al. | 364/489 |
| 5,619,709 | 4/1997 | Caid et al. | 707/532 |
| 5,634,122 | 5/1997 | Loucks et al. | 707/8 |
| 5,754,939 | 5/1998 | Herz et al. | 455/4.2 |

OTHER PUBLICATIONS

Scatter/Gather: A Cluster–based Approach to Browsing Large Document Collections, Pedersen et al., 15th Annual International SIGIR '92/Denmark, pp. 318–329, Jun. 1992.
Distributed Token Management in Calypso File System, Ajay Mohindra et al., Oct. 1994 IEEE, pp. 290–297.

*Primary Examiner*—Thomas G. Black
*Assistant Examiner*—Shahid Alam
*Attorney, Agent, or Firm*—David A. Dagg

[57] ABSTRACT

A top-down clustering method and apparatus recursively processes clusters of documents by first extracting features from the documents comprising the cluster, then using the extracted features to generate sub-clusters and finally using the generated sub-clusters to develop topics and identifiers for each sub-cluster. This process is repeated for each cluster and sub-cluster in a recursive manner so that clustering is performed using features extracted from each document in a cluster to perform sub-clustering. Feature extraction is performed by using frequency counts of terms taken from each document in a cluster and discarding terms falling outside of predetermined boundaries computed based on the total number of documents in the cluster. After bounding, the number of tokens is reduced prior to clustering by means of a correlation technique, such as a PCA model.

46 Claims, 6 Drawing Sheets

METHOD AND APPARATUS FOR AUTOMATICALLY GENERATING HIERARCHICAL CATEGORIES FROM LARGE DOCUMENT COLLECTIONS

FIELD OF THE INVENTION

This invention relates to methods and apparatus for automatically indexing large numbers of documents by using document contents to create categories and then placing each document into a category.

BACKGROUND OF THE INVENTION

The past few years have witnessed exponential growth in the variety of electronic sources of information. Consumers now live in an environment where vast quantities of diverse information are available to almost anyone at the touch of a button. For example, anyone with a computer and a modem can connect to the Internet and obtain information on almost any subject.

In such an environment, it is a non-trivial task for consumers to find the information they desire or even to discover what information is available. This task is more challenging where many consumers with diverse needs access the same body of data to browse or to obtain specific information. In such a case, it is difficult to organize the information for fast retrieval for a particular need without slowing the retrieval process for other needs. In many cases, the information is organized only for general searches.

Consequently, various general search techniques have been used to locate and retrieve information which may be of interest for a particular consumer. These search techniques generally examine the actual data and do not require any particular organization of the data. One commonly used technique is "keyword" searching where a consumer enters one or more words and the data is searched electronically to find all documents containing the words. Further sophistication can be added to the technique by combining keywords to form Boolean search strings. Simple keyword queries can be composed very quickly, however, they tend to be very general and under specified. Consequently, such queries often return a large number of document "hits" and the consumer must manually wade through a large number of retrieved articles to obtain pertinent information. On the other hand, just adding more keywords to the search string often produces too specific a query and over constrains the retrieval system. The result is that the search returns either very few, or no, documents. These problems are magnified further in an environment where the consumers are not entirely familiar with the underlying document collection, and where the information content is continuously changing. In this type of environment, the consumers may not even know what keyword or keyword strings to enter to begin the search process.

Various methods for organizing and retrieving information from databases have been developed in an attempt to overcome these problems. In one such method, the words or "terms" are extracted from a collection of text documents. Each of the documents is then represented as a term-by-document matrix. Singular value decomposition (SVD) is applied to the term-by-document matrix which generates three matrices that, together, uncover the underlying latent semantic structure of word usage in the documents. A consumer query, represented as a vector in the statistical domain, is compared with the document representations resulting from SVD, providing a consumer with a list of documents represented by vectors most closely matching the query vector. The consumer must then wade through the listed documents which may, or may not, be relevant to the query. The technique is disclosed in more detail in "Indexing by Latent Semantic Analysis", S. Deerwester et al., *Journal of the Society for Information Science*, v. 41, n. 6, pp. 391–407 (1990), and U.S. Pat. No. 4,839,853, by Deerwester, et al. See also "Numerical Recipes in C", *The Art of Scientific Computing*, William H. Press, Brian P. Flannery, Saul A. Teukolsky and William T. Vetterling. This method suffers from computational inefficiency, especially for large databases, as the technique involves representing a consumer query in the SVD domain and performing a computationally-demanding nearest-neighbor search between the query vector and each document vector in the domain.

In order to speed up the search and browse operations, "clustering" techniques are often employed to categorize related documents based on the terms in each document. A topic or identifier is associated with each category, which topic is often connected with the terms used to generate the category. The categories facilitate browsing because the consumer need only browse the topics or identifiers. Queries are also facilitated because, once a topic has been located, a search need only be performed on the documents in the associated category and not on the entire document body. Clustering is generally known in the art as a difficult and time consuming task. The more robust the clustering process, the more time it takes to run. For example, a clustering process can take from a few seconds to several hours depending on the size of the database. This arises in part due to the large dimensionality of the original domain.

Categories or clusters can be either single level or hierarchical. In single level clustering, the entire document body is divided into a flat set of categories. In hierarchical clustering, each category can also be divided into sub-categories. The sub-categories can, in turn, be divided into other subcategories and so on. With categorization, the document structuring problem reduces to the technique used to place documents into a particular category and a method for assigning a topic or identifier which is meaningfully related to the documents in the associated category.

Categorical indexers or directory services are typically used where a large body of documents must be broken down into some manageable divisions. For example, the popular net directory service, YAHOO, is an example of a directory service for world wide web home pages.

There are a number of conventional mechanisms for generating the categories and placing the documents into each category. One obvious technique is manual clustering. In this method, the categories are manually selected for each body of documents and each document is examined by a human being who places the document into one of the categories. The categories used in the aforementioned YAHOO directory is an example of such a manual clustering. This method is very labor intensive and time consuming where there are millions of documents.

Another technique of forming clusters is called "bottom up" clustering. This method involves dividing the set of documents into one of a set of initial categories by examining the content of the documents. The categories are then examined and groups of categories are combined to form higher level clusters or categories using the topics or identifiers. These higher level categories may then be further combined to form even higher level categories. This process is continued until a hierarchical category structure is produced. Bottom up clustering is generally performed using one of several well-known clustering algorithms which are known to be very computationally demanding. Further, because the algorithms need to manipulate the terms found in the entire set of documents, the dimensionality of the vectors used to represent each document tend to be very large. The necessity for manipulating large numbers of high dimensional vectors makes the computations slow. If the vector dimensions are reduced by reducing the number of terms used, then the clustering does not effectively capture the underlying information and fine-grained information is lost.

Still other clustering techniques fall under the general title of "top down" clustering. These methods involve representing each document in the set of documents by means of a vector which contains terms used in the document. The vectors are then used to break the document set into a small set of clusters. Then each cluster in this small set of clusters is clustered using the vectors previously set up for each document. Each of the resulting clusters is further clustered, again using the same vectors, and the process continues recursively until some preset limit is reached. One problem with such techniques is that, in order to keep the computational requirements within reasonable bounds the clustering algorithms used are relatively simple. Consequently, they often do not adequately capture the underlying correlation of words.

An example of a "top down" clustering technique which is used in a so-called "scatter/gather" method is described in detail in "Scatter/Gather: A Cluster Based Approach to Browsing Large Document Collections", D. R. Cutting, D. R. Karger and J. O. Pederson, *Proceedings of SIGIR '92* (1992). This technique is primarily used to generate an on-line browsing aid and does not have a query mechanism. The disclosed technique employs an on-line clustering algorithm to combine articles from chosen clusters. "On-line" means that the clustering process is not pre-computed but rather is performed in real-time. These clusters are then provided along with a "cluster digest" that comprises a list of the highest weighted terms in the cluster.

One problem is that the "scatter/gather" technique uses algorithms that were designed for on-line use or off-line algorithms that were adapted from on-line algorithms. Clustering algorithms are generally designed for speed when they are designed for on-line use, but clustering algorithms designed for on-line applications generally are less robust than off-line clustering algorithms. They do not use a dynamic representation of the document in each stage of the hierarchy; a static representation of a document is computed at the highest level of the hierarchy and the same representation is used throughout. Consequently, the results are less robust than other techniques.

Another clustering solution uses frequency-based document clustering, with clustering performed using the top percentage of query "hits". Although this technique is slightly faster because the size of the data is reduced, data from other non-retrieved clusters is ignored, and therefore, the retrieval is less robust.

Therefore, there is a need for organizing large sets of documents in response to a user query in a time efficient and robust manner.

SUMMARY OF THE INVENTION

In accordance with one embodiment of the invention, a top down clustering method and apparatus processes each cluster by first extracting features from the documents comprising the cluster, then using the extracted features to generate sub-clusters and finally using the generated sub-clusters to develop topics and identifiers for each sub-cluster. This process is repeated for each cluster and sub-cluster in a recursive manner so that clustering is performed using features extracted from the documents in each cluster to perform sub-clustering.

In accordance with one embodiment feature extraction is performed by using frequency counts of terms taken from each document in a cluster and discarding terms falling outside of predetermined boundaries to generate tokens for each document.

In accordance with another embodiment, the predetermined boundaries are computed based on the total number of documents in the cluster being examined. A new vector-space model is built based on documents in the cluster. In this way, a dynamic representation of each document in different stages of the clustering process is achieved.

In accordance with yet another embodiment, the number of tokens is reduced prior to clustering by means of a correlation technique such as a PCA model.

In accordance with another embodiment, after clustering is performed, a predetermined number of the tokens used to perform the clustering are formed into vectors and processed to eliminate duplicates. The resulting vector table can be processed with similarity detection techniques to allow lateral navigation from a cluster to other related clusters on the same level or on other levels.

BRIEF DESCRIPTION OF THE DRAWINGS

The above and further advantages of the invention may be better understood by referring to the following description in conjunction with the accompanying drawings in which.

DESCRIPTION OF THE PREFERRED EMBODIMENT

As used herein, the term "document" includes written articles, papers, as well as written statements, phrases and comments or groups of words, however loosely connected in a written work. The term "domain" is defined herein as a collection of documents, for example, a database. Note that while the detailed description of the present invention describes embodiments in the field of text information retrieval, this is by way of example only. The present invention has application in other fields as well, including data mining and information filtering, for example, as described above. In addition, the methods and techniques discussed herein apply to other technologies such as pattern recognition and other areas which permit feature extraction and clustering.

Figure 1:
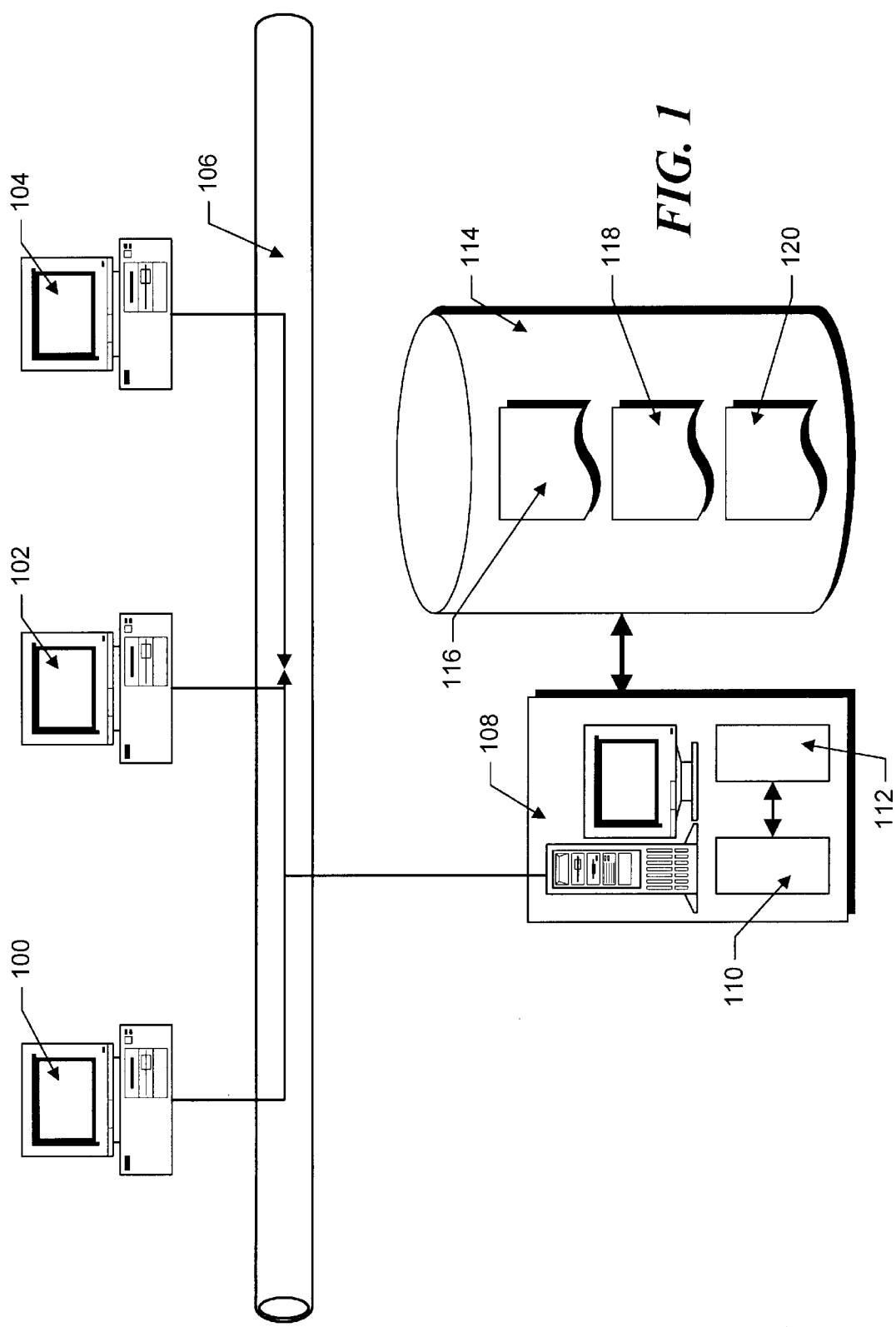
FIG. 1 is a schematic diagram of a prior art computer system on which the method of the present invention can be run.

FIG. 1 illustrates a computer system employing the present invention. One or more working terminals or computers, 100, 102 and 104, are coupled to a storage device 114. Preferably working terminals 100–104 are, for example, IBM™ PC's having Intel™ XX386™ or better processing capabilities and support devices, input means (e.g., keyboard, mouse . . . ), and the like. Various users of working terminals 100–104 generate documents such as documents 116–120. Although only three documents 116–120 are illustrated, generally database 114 would comprise a relatively large number of documents, for example several million. A typical application for a system such as that shown in FIG. 1 is an Internet web page directory service. The Internet currently has approximately 30 million web pages and, typically, such a directory will have a subset of several million of these pages.

The documents 116–120 are forwarded from respective generating terminals 100–104 and retained in storage 114. For example, each of documents 116–120 may be represented by a text file, ASCII file or similar file in storage 114. Storage 114 is configured as a conventional database or data structure for holding documents 116–120 in electronic data form. The database can be structured to operate with a standard search and retrieval protocol such as a conventional Structured Query Language (SQL) protocol. This enables consumers at working terminals 100–104 to retrieve from storage 114, documents 116–120 or other information previously stored therein. In one embodiment, consumers perform this retrieval by generating search queries formed of words or "terms" indicative of the subject matter or content of desired ones of documents 116–120. The search queries are transmitted to a search and/or retrieval engine 110 associated with storage 114. In response, the retrieval engine 110 determines which of stored documents 116–120 are relevant based on the given keywords.

Rather than simply retrieving all documents which contain the search query generated by the consumer, the present invention assists in performing a search by dividing the body of documents into categories, or clusters, where the documents therein have related content. Keywords are then automatically generated for each cluster. The generated keywords are indicative of the common content of the documents in each cluster. In this manner, each of documents 116–120 stored in storage 114 becomes part of a cluster and the consumer need only search relevant clusters, thereby reducing the number of documents over which a search is performed considerably. The reduction in the number of documents reduces both the search time and the number of documents returned by the search, thereby conserving the consumer's time in reviewing the relevant documents.

Advantageously, the present invention also provides a post-query navigation method and apparatus useful in locating related information in clusters other than those actually searched, once relevant documents are located in one cluster. This capability is very useful in locating related material in clusters in the same level or other levels.

The retrieval engine 110 and apparatus for the present invention 112 as shown in FIG. 1 are operated or executed on a digital processor 108. Digital processor 108 may be a server or host for a network 106 of working terminals 100–104. Alternatively, the digital processor 108 can be a processor unit in any one or more of working terminals 100–104. In the preferred embodiment, the apparatus of the present invention 112 is a task, subroutine, or procedure called from a retrieval engine 110. After initialization, the subroutine 112 performs the processes described in detail below.

Figure 2:
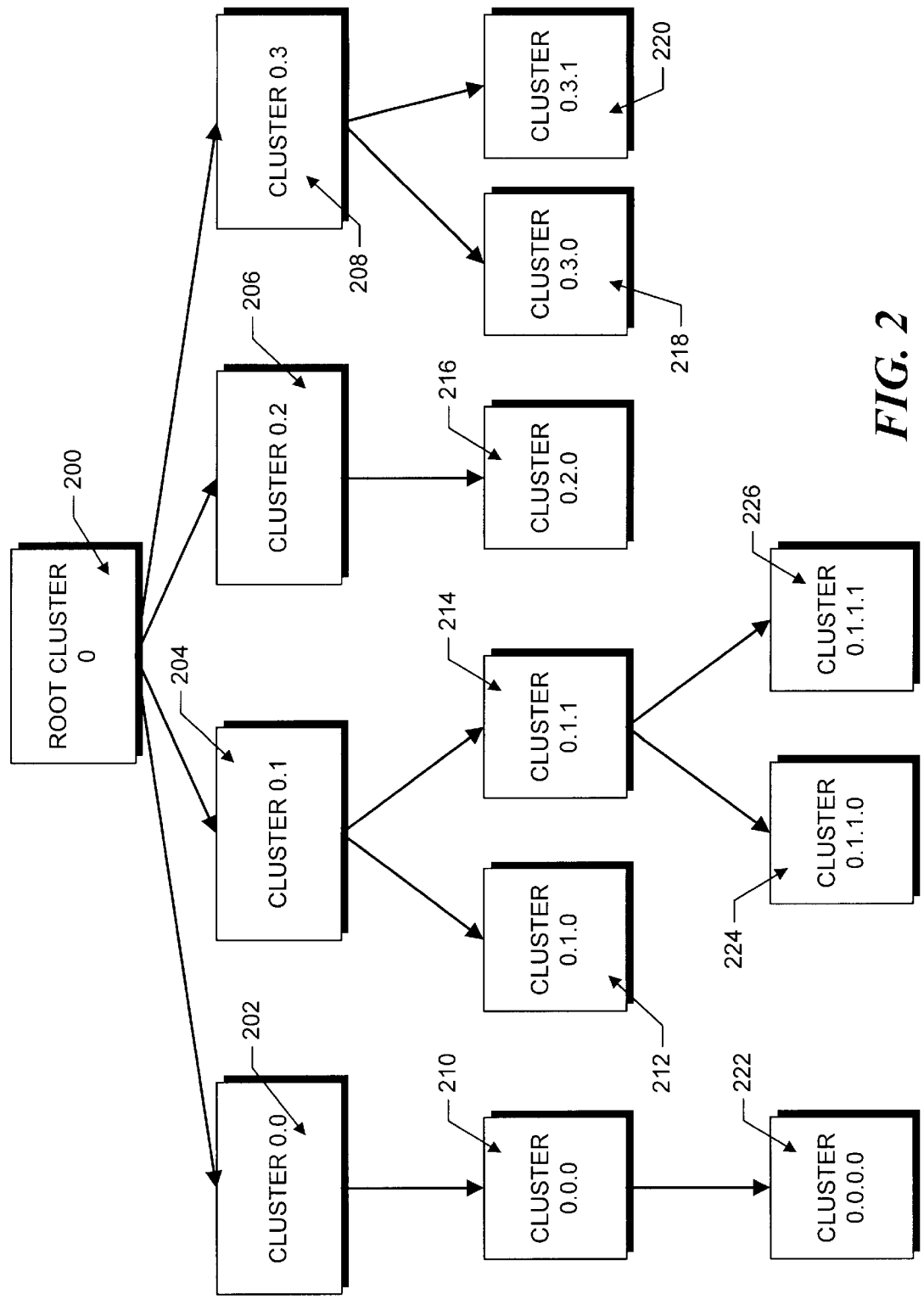
FIG. 2 is a schematic diagram which illustrates a hierarchical clustering for a body of documents.

FIG. 2 illustrates a typical cluster hierarchy which is generated in accordance with the principles of the present invention. Each of the boxes represents a cluster or group of documents. The root cluster 200, arbitrarily denoted as cluster 0, consists of the entire body of documents (sometimes called the "corpus".) When the inventive method is applied to the root cluster, a first level of sub-clusters is generated; the sub-clusters 202–208 on this level are denoted as clusters 0.0–0.3. Each of these sub-clusters 202–208 contains some of the documents in the root cluster 200 and each document appears in only one of sub-clusters 202–208 on a given level.

In accordance with the principles of the invention, the inventive method is applied to each of the sub-clusters, 202–208, treating each sub-cluster as a new domain, to generate the sub-clusters in the next lower level. For example, sub-cluster 202 is processed to generate sub-cluster 210 and sub-cluster 210 is, in turn, operated on to generate sub-cluster 222.

In a similar manner, sub-cluster 204 can be processed by the inventive method to generate sub-clusters 212 and 214. Sub-cluster 214 is used to generate subpocket clusters 224 and 226. Sub-cluster 206, when operated on by the inventive method, generates sub-cluster 216, and sub-cluster 208, in turn, generates sub-clusters 218 and 220. This process continues until a predetermined limit is reached. The sub-clusters on the last level are called "leaf" clusters. The hierarchical diagram in FIG. 2 is illustrative, the actual hierarchical configuration generated by the inventive method, depends on the document content and other factors which will be hereinafter discussed. What is important to note with respect to FIG. 2 is that, after a cluster has been operated on according to the inventive method to generate one or more sub-clusters, each of the sub-clusters becomes a new "domain" and the inventive method is applied anew to it. The documents within each sub-cluster are subjected to processing using the content of the documents in that sub-cluster. Consequently, the keywords associated with that sub-cluster will become more closely connected to the document content as the cluster hierarchy is traversed from the root cluster to the leaf clusters.

Figure 3:
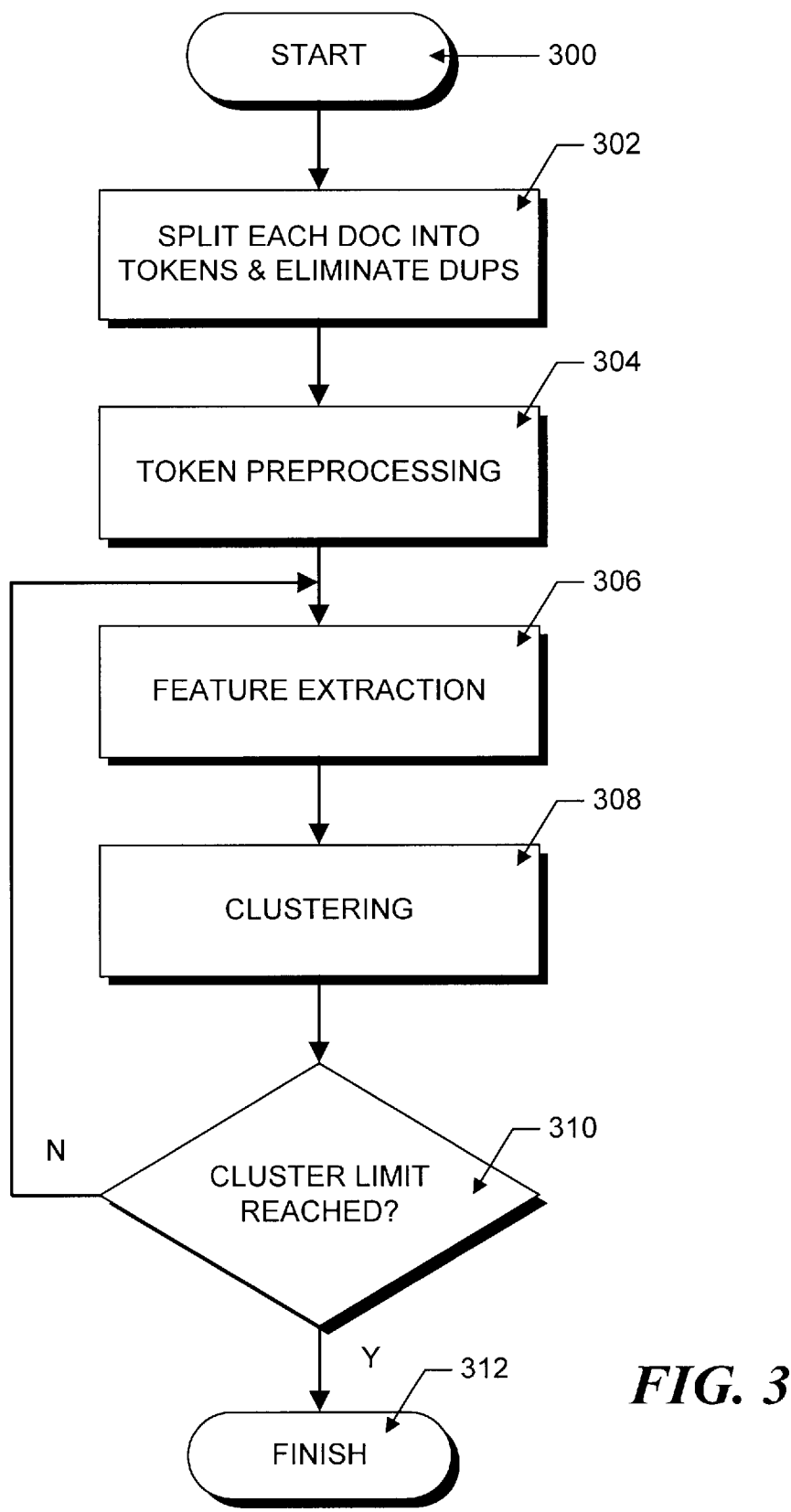
FIG. 3 is a flowchart illustrating steps for performing the inventive method.

FIG. 3 is an illustrative flowchart showing the main steps in the present invention for each new cluster. The inventive routine begins in step 300 and immediately proceeds to step 302 in which each document in the cluster is separated into "terms" or "tokens" using a set of predefined "delimiters" which are appropriate to the type of documents in the cluster. In the case of English text documents, these delimiters would include spaces, periods, commas, etc. After all of the documents have been separated into tokens, the resulting tokens are gathered together to form the token group for that cluster being processed and any duplicate tokens are removed, as illustrated in step 302.

Next, in step 304, the tokens are subjected to "preprocessing." In this step, a set of rules is applied to the tokens to reduce the number of tokens. Typically, at this point, for a group of documents, there are thousands of tokens. Some of these tokens do not represent meaningful data and must be eliminated. These latter tokens are eliminated by following a standardized series of steps based on a set of format rules to reject tokens. By way of example, illustrative preprocessing steps and format rules may include the following for English language text documents:

Step 0 Remove all tokens with numerical characters.

Step 1 Remove all tokens with three consecutive characters which are the same.

Step 2 Normalize all upper and lower case letters to lower case letters

Step 3 Remove all tokens having characters other than alphanumeric characters and the characters "–" or "_".

Step 4 For all tokens including either the character "-" or the character "_", remove "-" or "_" from the string and concatenate the resulting strings (e.g., "back-up" becomes "back up" which becomes "backup").

Step 5 Remove all tokens appearing in a predetermined list of terms. This list might contain, for example, tokens such as articles ("a", "the"), conjunctions ("and", "or") or other words which generally do not convey content information.

Step 6 Remove all tokens appearing in a text line if the line is at the end of a document and the line comprises less than 3 tokens (e.g. signatures and/or closing lines.)

Next, in step 306, feature extraction is performed on the remaining tokens. Feature extraction reduces the number of tokens to those which are "significant" with respect to the content of document in which they are found. Feature extraction can be done using conventional methods which reduce the set of possible tokens to a smaller subset which contains tokens that are correlated to each other.

Figure 4:
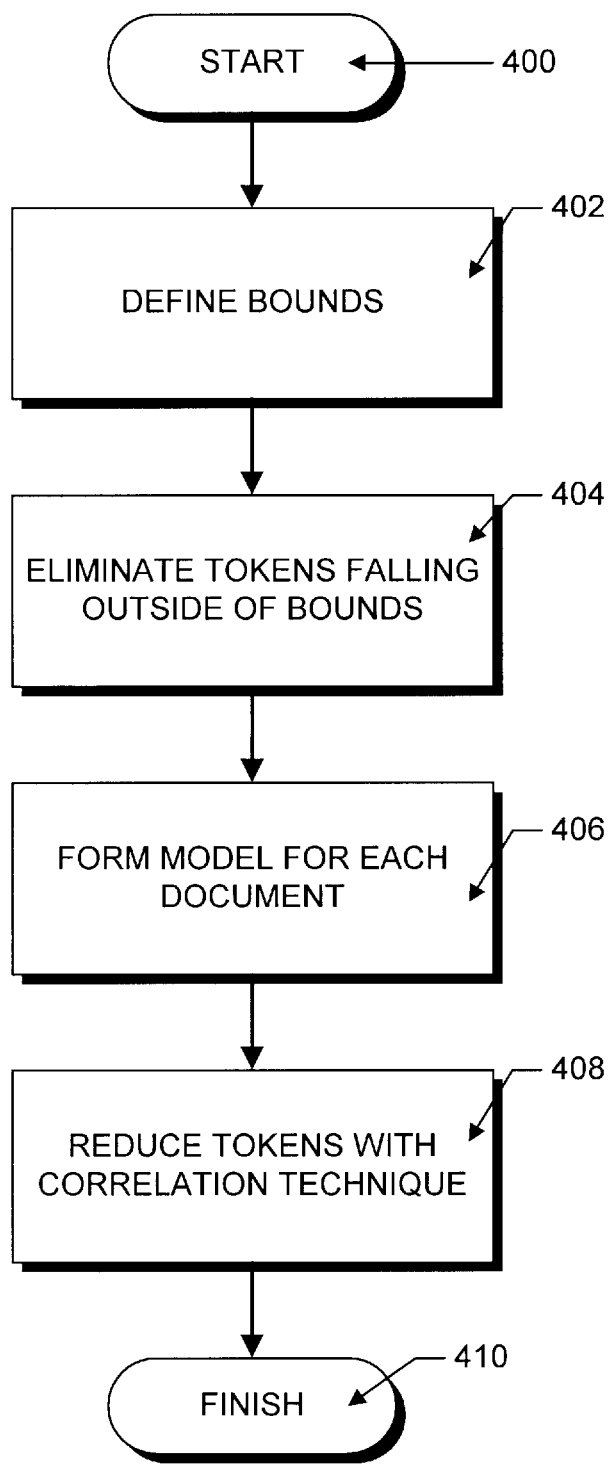
FIG. 4 is a more detailed flowchart illustrating the steps for performing feature extraction in accordance with a preferred embodiment of the present invention.

An illustrative feature extraction process is illustrated in FIG. 4. The process starts in step 400 and proceeds to step 402 in which an upper and lower bound are defined. In accordance with the principles of the invention, these bounds are functions of the total number of documents in the cluster being processed. The lower bound insures that the retained tokens appear in at least a certain number of documents. The upper bound does two things. First, it helps to eliminate common terms such as articles and conjunctions which generally do not convey significant information concerning the content of the documents in which they are found. Secondly, and more importantly, the upper bound eliminates terms which appear in most, if not all, of the documents. Additionally, the weighting methods used in the vector-space model assign a relatively low weight to commonly occurring terms and relatively higher weights to rarer terms. Since the documents in a cluster are placed in that cluster because they contain particular terms, those terms will be eliminated by the upper bound. This elimination brings forth terms which differentiate documents in that cluster. Since feature extraction is performed on each cluster, as each clustering operation is performed, the documents are described by terms with finer "granularity".

The upper and lower bounds can be set empirically based on past history and performance of the clustering process. It has been found that an upper bound of N/10, where N is the total number of documents in the cluster, and a lower bound of N/100 produce satisfactory results. In a preferred embodiment, a set of tokens generated by the preprocessing step 304 are counted to generate token frequency counts. More specifically, a count is taken of the number of documents in which each token appears to generate a frequency counts for that token. This token frequency count is then compared to upper and lower bounds, and those tokens which fall outside the bounding range are removed from the token set, as set forth in step 404.

If the number of remaining tokens is larger than the number of documents in the cluster, then the tokens are sorted by token frequency count and the tokens with the highest frequency count are used until the number of tokens is one less than the number of documents. The remaining set of tokens is defined as the "domain" for the current set of documents being clustered.

Figure 5:
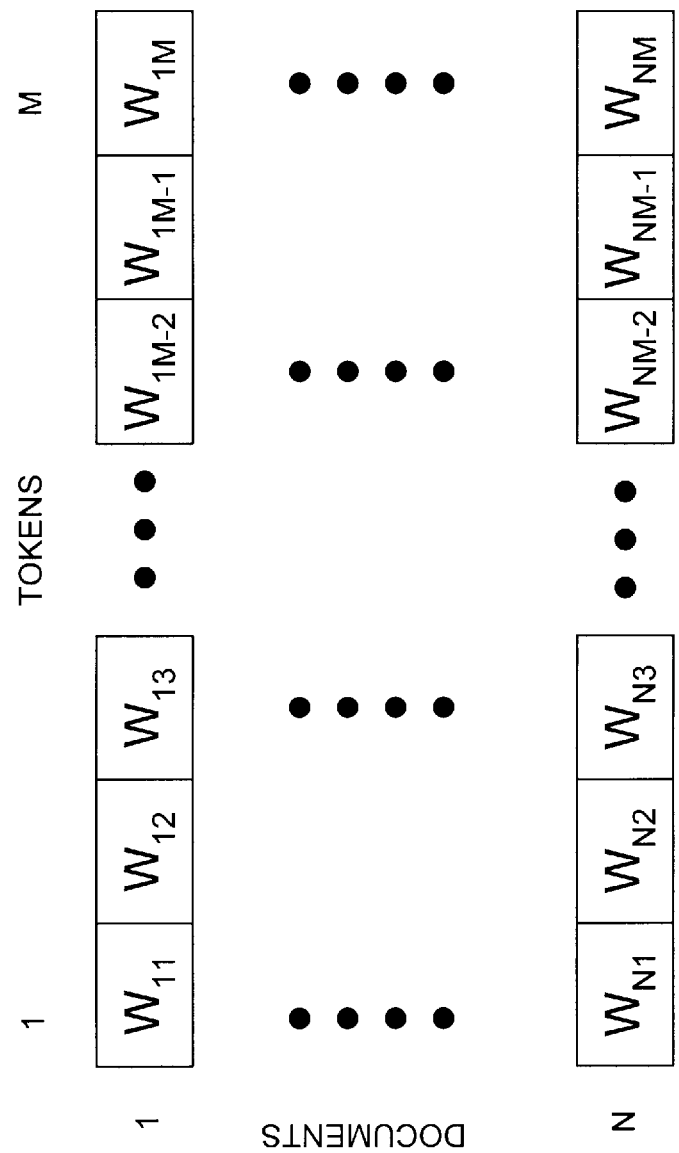
FIG. 5 is a schematic diagram of a document term matrix formed during processing of the present invention.

The documents in the cluster being processed are then modeled by forming a "vector space" model for each document as set forth in step 406. This model is well-known and will be used to illustrate the preferred processing. The model uses a vector matrix such as matrix 500 illustrated in FIG. 5. Initially, each of the N documents in the cluster being processed is represented as M dimensional vectors, such as vectors 502 and 504, where M represents the number of tokens in the domain remaining after preprocessing and bounding.

More specifically, each document is represented by a vector of M weighting factors, W, with one weighting factor being assigned to each token. If a token does not appear in the document, then the weighting factor for that token is assigned zero. The weighting factors for non-zero weights can be obtained by using one of several conventional weighting techniques such as tf_idf weighting, normalized tf_idf weighting, log-entropy weighting and other well-known weighting techniques. The first two weighting methods are described in detail in an article entitled "Length Normalization in Degraded Text Collections", Singhal, et al., TR95-1507, Dept. of Computer Science, Cornell University, which are incorporated herein by reference. The tf$_{idf}$ weighting method is one of the most popular weighting methods used in document clustering and classification. The "tf" or "term-frequency" value for a token is a simple count of the occurrences of that token in a specified document. With this usage the weighting factor for each token is given by:

$$W_{ij} = tf_{ij} \cdot \log\left(\frac{n_{documents}}{df_i}\right)$$

where $W_{ij}$ is the assigned weight of token "i" in document "j".

$tf_{ij}$ is the frequency of occurrence of token "i" in document "j".

dfi is the total number of documents in which token "i" occurs.

$n_{documents}$ is the total number of documents in the cluster.

However, in accordance with a preferred embodiment, a normalized tf_idf weighting is used. This weighting method is a variant of the tf_idf method which accounts for the length of each document by using a normalization factor. The formula for the computation of the weight $W_{ij}$ according to the normalized tf_idf method is as follows:

$$W_{ij} = \frac{0.5 + 0.5 * \frac{tf_{ij}}{\max(tf_{ij})} * \log\left(\frac{n_{documents}}{df_i}\right)}{\sqrt{\Sigma\left(\left(0.5 + 0.5 * \frac{tf_{ij}}{\max(tf_{ij})}\right)\log\left(\frac{n_{documents}}{df_i}\right)\right)^2}}$$

where $W_{ij}$ is the weight of term "i" in document "j".

$tf_{ij}$ is the frequency of occurrence of token "i" in document "j".

$df_i$ is the total number of documents in which token "i" occurs.

$n_{documents}$ is the total number of documents in the cluster.

The initial matrix 500 is preferably held in working memory. For the purposes of discussion, this vector matrix 500 of documents by terms will be denoted as matrix A.

Next, in step 408, the dimensionality of the matrix A in the token dimension is reduced illustratively by using a basis which interrelates the tokens. In a preferred embodiment, a basis commonly called a Principal Component Analysis (PCA) is used. PCA involves a computation of the "eigenvectors" of a matrix derived from the matrix A and projection of the initial matrix onto the eigenvectors. The eigenvectors can be computed from a sum-squared-of-products matrix, a correlation matrix, or a covariance matrix derived from the initial matrix A. This technique is well-known and, consequently, the details will not be discussed below.

Figure 6:
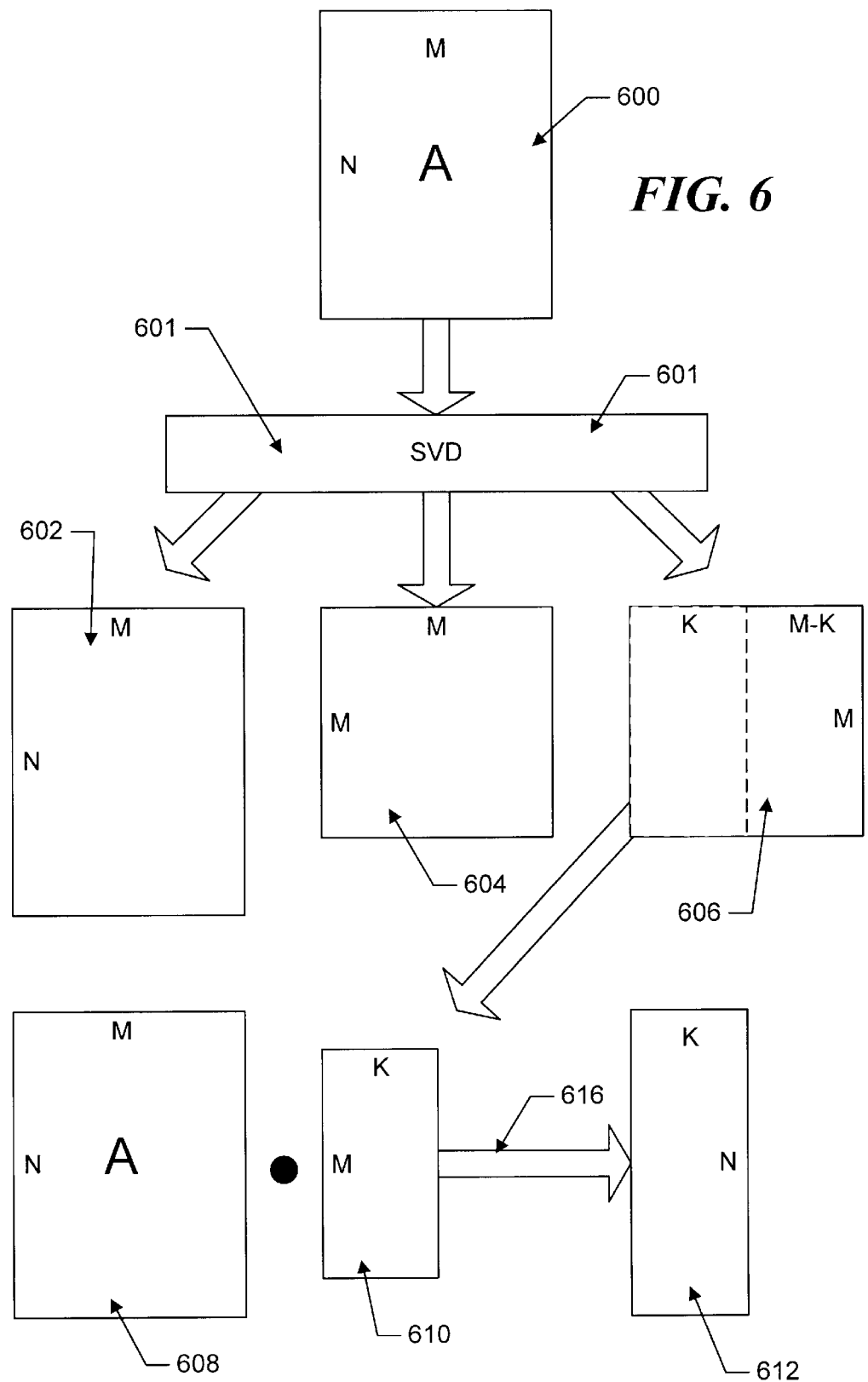
FIG. 6 is a schematic diagram illustrating a PCA modeling process.

A technique called Singular Value Decomposition (SVD) is one of several methods for computing the eigenvectors. SVD is preferred because it is the most computationally efficient of the known methods and is illustrated in FIG. 6.

In accordance with the Singular Value Decomposition technique 601, the matrix A as described below, is decomposed to obtain a left matrix 602 of N×M dimensions representing the eigenvectors of $AA^T$ where $A^T$ is the transpose of the matrix A; a center (or singular) matrix 604 of M×M dimensions consisting of the singular values of the matrix A; and a right matrix 606 of M×M dimensions. In a preferred embodiment of the present invention, the right matrix 606 comprises the eigenvectors of the sum-squared-of-products matrix $A^TA$ (A transpose A), however, depending on the application, the eigenvectors of the covariance or correlation matrix may be used. Those skilled in the art will readily be able to determine which eigenvectors to use. In the preferred embodiment, a public domain software program called SVDPACK™ is employed to carry out the SVD operation.

The next step in forming a PCA model is to reduce the dimensions of the right M by M matrix 606 to a working matrix of loading vectors with M by K dimensionality 610 as illustrated by arrow 614. This reduction involves reducing the number of columns in matrix 606 from M columns to K columns where K is much less than M. The larger the value of K, the more literal the connection is between documents. The smaller the value of K, the more conceptual the relationship is between documents. Illustratively, K may be chosen according to the following relationships:
1) 100<K<200 for clusters having up to 100,000 documents;
2) K≧200 for clusters having greater than 100,000 documents.
Other relationships can also be used.

Next, the initial matrix A (608) is projected onto the working matrix of loading vectors 610 as represented by arrow 616. The projection of the matrix 608 into the reduced dimensional space of loading vector matrix 610 is obtained as shown below to form a matrix of reduced dimensionality 612:

$$P = A \times E^T$$

where
P is the matrix of reduced dimensionality 612
$E^T$ is the working matrix of loading vectors 610
A is the initial matrix 608

This latter step allows linear mapping of multidimensional data onto lower dimensions with a minimal loss of information. The projection matrix 612 yields independent combinations of the individual variables that represent directions of greatest variance in the original variable space. These combinations are the eigenvectors of the covariance matrix of the initial matrix 608. The projection 616 yields a matrix 612 of reduced dimensions N by K which contains "PCA variables." For purposes of the present invention, the PCA "variables" comprise individual terms which are selected to capture underlying correlations in the tokens. The reduced dimensionality of the matrix 612 permits efficient manipulation of the resulting vectors.

In particular, the matrix 612 contains principal component scores $F_{ij}$ given by the following:

$$F_{ij} = \sum_{h=1}^{M} (W_{ih} y_{hj})$$

where
$I \in \{1, \ldots, N\}$ and references a document;
$j \in \{1, \ldots, K\}$ and refers to a reduced dimension of a document vector;
$W_{ih}$ is the weight of the term "h" in document "I"; and
$y_{hj}$ is the eigenvalue at the $j^{th}$ position in loading vector "h".

The matrix 612 thus represents the documents as K-dimensional vectors. Although dimension and noise are reduced for purposes of manageability by the PCA process, important combinations of linear indicative tokens are maintained in the vectors of matrix 612. The feature extraction routine is then finished in step 410.

Referring back to FIG. 3, after feature extraction is completed in step 306, clustering is performed in step 308. More particularly, after the subset of tokens has been reduced by feature extraction, the reduced dimension matrix 612 is clustered by using one of several available algorithms. In a preferred embodiment, a Euclidean distance metric and a k-means clustering algorithm are used to generate sub-clusters. During this step, a set of topical words with normalized scores and other details is also computed for each cluster.

More specifically, in a preferred embodiment, a k-means clustering algorithm is employed, such as that described in "Algorithms for Clustering Data," A. C. Jain and R. C. Dubes, *Prentice Hall Advanced Reference Series,* Prentice Hall, Englewood Cliffs, N.J. 07632, p.p.s. 96–101, (1988), which is hereby incorporated herein by reference. Other clustering algorithms can also be employed, but the k-means method is computationally efficient. As a result of applying the technique, clusters of documents are formed and represented by the vectors of the N×K matrix 612.

Next, topic tokens which describe the cluster are selected. For each document in a given cluster, the tokens which had substantial effect on that cluster are used as topic tokens. The topic tokens are selected by examining each of the products $W_{ih} y_{hj}$ being summed to generate the principal component scores, $F_{ij}$, used in the PCA process discussed above. The largest of such products are identified and the corresponding tokens are considered to be the words having the most impact or greatest effect on the cluster to which the document has been assigned. In the preferred embodiment, the products $W_{ih} y_{hj}$ are normalized according to any of several known methods. For example, normalization of a product can be performed by forming a ratio of the product to the largest product used to generate a principal component score. The former serves as a numerator and the latter is the denominator. Tokens corresponding to the ratios having a value greater than 0.5 are deemed to have substantial (maximal) impact on a cluster and are identified as topic tokens.

Referring to FIG. 3, after clustering is complete, in decision step 310, a determination is made whether a cluster "limit" has been reached. For example, for each of the sub-clusters, a check might be made whether the number of documents in a sub-cluster is larger than some predetermined sub-cluster threshold. When the number of documents in the sub-cluster is greater than the threshold, then the inventive method returns to step 306 and is applied to the sub-cluster to generate further sub-clusters. Alternatively, if the number of documents in a particular sub-cluster is less than the threshold, then the sub-clusters is a leaf cluster and no further processing is performed whereupon the routine ends in step 312. Each sub-cluster is processed in this manner until all sub-clusters are determined to be leaf sub-clusters.

The inventive method is especially useful for a large number of documents and has several advantages over prior art techniques. First, the dynamic representation scheme for each document in different stages of the hierarchical decomposition has the advantage that a smaller number of tokens is used in each step of the hierarchical decomposition thus reducing computation time. Further, since a different set of tokens will be part of the domain at each sub-cluster level, the inventive method still uses the rich volume of vocabulary available in the corpus for finer granularity, down the hierarchy.

Second, use of the PCA model for each sub-cluster allows the inventive method to capture the correlation between the tokens in each sub-cluster. New documents can be easily routed into the hierarchy by representing the document in each sub-cluster by the tokens in the appropriate domain and fitting the document into appropriate sub-clusters.

Third, the nearest neighbors of each document in a cluster can be easily computed by calculating the distance from all documents within the cluster, as opposed to all the documents in the corpus. The reduced number of documents used in the calculation provides significant savings in computation time.

Fourth, relatively little further processing is needed to allow for navigation between clusters. In particular, navigation can be accomplished by computing the distance between clusters. This distance can be computed by using the set of topic tokens which characterize each cluster. The topic tokens are collected from all levels in the cluster hierarchy and a unique list is created by eliminating duplicates. Then each cluster is modeled by a vector similar to that used to model each document. The number of dimensions of the vector is equal to the number of words in the unique list. The weights used for this vector space model are the normalized weights that define the top "n" words of each "cluster." Then a distance measure such as a cosine similarity measure is used between vectors to identify related clusters. Related clusters allow a consumer to move between clusters on the same level, and on different levels, which clusters do not descend from the same cluster on the previous level. This navigation technique allows for easy browsing between sub-topics. This would be more difficult in a situation where all decomposition has been done using a static vector-space model representation.

While this invention has been particularly shown and described with references to preferred embodiments thereof, it will be understood by those skilled in the art that various changes in form and detail may be made therein without departing from the spirit and scope of the invention as defined by the appended claims. Although the invention has been shown operating with documents in the English language, the same technique can be used with other natural languages as well. For example, the disclosed method will operate with French, German and Dutch without change.

What is claimed is:

1. A method for automatically generating a cluster hierarchy from a large number of documents, the method comprising the steps of:

A. generating a set of unique tokens from the documents;
   B. modeling each document in a cluster with one or more of the tokens;
   C. extracting features from the modeled documents in the cluster;
   D. clustering the documents using the extracted features so that the documents in the cluster are subdivided into further clusters; and
   E. repeating steps B, C and D for each cluster generated in step D until a predetermined limit is reached.

2. The method according to claim 1 wherein step A comprises the steps of:

A1. separating each document into tokens with a predetermined set of delimiters to generate a pool of tokens;
   A2. removing duplicates from the pool of tokens; and
   A3. preprocessing the pool of tokens to eliminate selected tokens which do not represent meaningful data.

3. The method according to claim 1 wherein step B comprises the steps of:

B1. generating a token frequency count for tokens used in documents in the cluster;
   B2. eliminating tokens whose frequency count falls above a predetermined upper limit and below a predetermined lower limit; and
   B3. modeling the documents in the cluster using the remaining tokens.

4. The method according to claim 3 wherein the predetermined upper limit is a function of a number of documents in the cluster.

5. The method according to claim 3 wherein the predetermined lower limit is a function of a number of documents in the cluster.

6. The method according to claim 1 wherein step C comprises the steps of:

C1. performing a PCA analysis on the modeled documents.

7. The method according to claim 6 wherein step C1 comprises the steps of:

C1a. computing eigenvectors from a matrix derived from the modeled documents to form a matrix; and
   C1b. reducing the dimensions of the matrix.

8. The method according to claim 1 wherein step D comprises the steps of:

D1. applying a clustering algorithm to the extracted features to generate one or more clusters each containing documents from the cluster; and
   D2. selecting topic tokens for each of the clusters determined in step D1 from the tokens associated with the each cluster.

9. The method according to claim 8 wherein step D1 comprises the step of:

D1a. applying a clustering algorithm to the extracted features to generate one or more clusters each containing documents from the cluster.

10. The method according to claim 1 wherein step E comprises the step of:

E1. repeating steps B, C and D until the number of documents in each cluster reaches or falls below a predetermined threshold.

11. The method according to claim 1 wherein step E comprises the step of:

E2. repeating steps B, C and D until the total number of clusters exceeds a predetermined threshold.

12. The method according to claim 1 further comprising the step of:

F. calculating nearest neighbors of each document in a cluster.

13. The method according to claim 1 further comprising the step of:

G. calculating distances between clusters.

14. A method for automatically generating a cluster hierarchy from a large number of documents, the method comprising the steps of:

A. generating a set of unique tokens from the documents;

B. preprocessing the set of unique tokens to remove tokens according to predetermined rules;

C. forming a token frequency count for each token used in the documents in a cluster and removing tokens whose frequency count falls outside of upper and lower bounds that are functions of the number of documents in the cluster;

D. modeling the documents in the cluster with the remaining tokens;

E. using a PCA analysis to extract features from the modeled documents;

F. clustering the extracted features so that documents in the cluster are apportioned to additional clusters; and G. repeating steps C–F for each cluster generated in step F until a predetermined limit is reached.

15. The method according to claim 14 wherein step A comprises the step of:

A1. separating each document into tokens using a predetermined set of delimiters.

16. The method according to claim 14 wherein step B comprises the step of:

B1. removing tokens with numerical characters and tokens in a predefined list of terms.

17. The method according to claim 14 wherein step C comprises the step of:

C1. removing tokens whose frequency count is higher than an upper bound equal to the number of documents in the cluster divided by ten.

18. The method according to claim 14 wherein step C comprises the step of:

C2. removing tokens whose frequency count is lower than a lower bound equal to the number of documents in the cluster divided by one hundred.

19. The method according to claim 14 wherein step D comprises the steps of:

D1. forming a vector space model of each document in the cluster with the remaining tokens.

20. The method according to claim 19 wherein step E comprises the steps of:

E1. computing eigenvectors from the sum-squared-of-products matrix, covariance matrix or correlation matrix of the modelled documents to form a matrix; and E2. reducing the dimensions of the matrix to generate extracted features.

21. The method according to claim 14 wherein step F comprises the step of:

F1. applying a k-means clustering algorithm to the extracted features to generate one or more clusters each containing documents from the cluster.

22. The method according to claim 14 further comprising the step of:

H. calculating nearest neighbors of each document in a cluster and all other documents in the cluster.

23. The method according to claim 14 further comprising the steps of:

I. selecting topic tokens for each of cluster from the tokens associated with the each cluster;

J. collecting all topic tokens into a list and eliminating duplicates;

K. modeling each cluster using a predetermined number of the remaining topic tokens; and L. using a distance measure to identify related clusters.

24. Apparatus for automatically generating a cluster hierarchy from a large number of documents, the apparatus comprising:

means for generating a set of unique tokens from the documents;

means for modeling each document in a cluster with one or more of the tokens;

means for extracting features from the modeled documents in the cluster;

means for clustering the documents using the extracted features so that the documents in the cluster are subdivided into further clusters; and a mechanism for controlling the modeling means, the extracting means and the clustering means to process each cluster generated by the clustering means until a predetermined limit is reached.

25. The apparatus according to claim 24 wherein the token generating means comprises:

means for separating each document into tokens with a predetermined set of delimiters to generate a pool of tokens;

means for removing duplicates from the pool of tokens; and means for preprocessing the pool of tokens to eliminate selected tokens which do not represent meaningful data.

26. The apparatus according to claim 24 wherein the modeling means comprises:

means for generating a token frequency count for tokens used in documents in the cluster;

means for eliminating tokens whose frequency count falls above a predetermined upper limit and below a predetermined lower limit; and means for modeling the documents in the cluster using the remaining tokens.

27. The apparatus according to claim 26 wherein the predetermined upper limit is a function of a number of documents in the cluster.

28. The apparatus according to claim 26 wherein the predetermined lower limit is a function of a number of documents in the cluster.

29. The apparatus according to claim 24 wherein the extracting means comprises:

means for performing a PCA analysis on the modeled documents.

30. The apparatus according to claim 29 wherein the performing means comprises:

means for computing eigenvectors from sum-squared-of-products matrix, covariance matrix or correlation matrix of the modeled documents to form a matrix; and means for reducing the dimensions of the matrix.

31. The apparatus according to claim 24 wherein the clustering means comprises:

means for applying a clustering algorithm to the extracted features to generate one or more clusters each containing documents from the cluster; and means for selecting topic tokens for each of the clusters determined by the applying means from the tokens associated with the each cluster.

32. The apparatus according to claim 31 wherein the applying means comprises:

means for applying a k-means clustering algorithm to the extracted features to generate one or more clusters each containing documents from the cluster.

33. The apparatus according to claim 24 wherein the controlling mechanism comprises:
   means for controlling the modeling means, the extracting means, and the clustering means to process clusters until the number of documents in each cluster reaches or falls below a predetermined threshold.

34. The apparatus according to claim 24 wherein the controlling mechanism comprises:
   means for controlling the modeling means, the extracting means, and the clustering means to process clusters until the total number of clusters exceeds a predetermined threshold.

35. The apparatus according to claim 24 further comprising:
   means for calculating nearest neighbors of each document in a cluster.

36. The apparatus according to claim 24 further comprising:
   means for calculating distances between clusters.

37. A computer program product for automatically generating a cluster hierarchy from a large number of documents, the computer program product comprising a computer usable medium having computer readable program code thereon including:
   program code for generating a set of unique tokens from the documents;
   program code for preprocessing the set of unique tokens to remove tokens
   according to predetermined rules;
   program code for forming a token frequency count for each token used in the documents in a cluster and removing tokens whose frequency count falls outside of upper and lower bounds that are functions of the number of documents in the cluster;
   program code for modeling the documents in the cluster with the remaining tokens;
   program code for using a PCA analysis to extract features from the modeled documents;
   program code for clustering the extracted features so that documents in the cluster are apportioned to additional clusters; and
   program code for controlling the forming program code, modeling program code, extraction program code, and clustering program code to process each cluster generated by the clustering program code until a predetermined limit is reached.

38. The computer program product according to claim 37 wherein the generating program code comprises:
   program code for separating each document into tokens using a predetermined set of delimiters.

39. The computer program product according to claim 37 wherein the preprocessing program code comprises:
   program code for removing tokens with numerical characters and tokens in a predefined list of terms.

40. The computer program product according to claim 37 wherein the forming program code comprises:
   program code for removing tokens whose frequency count is higher than an upper bound equal to the number of documents in the cluster divided by ten.

41. The computer program product according to claim 40 wherein the forming program code comprises:
   program code for removing tokens whose frequency count is lower than a lower bound equal to the number of documents in the cluster divided by one hundred.

42. The computer program product according to claim 37 wherein the modeling program code comprises:
   program code for forming a vector space model of each document in the cluster with the remaining tokens.

43. The computer program product according to claim 42 wherein the using program code comprises:
   program code for computing eigenvectors from the vector space models to form a matrix; and
   program code for reducing the dimensions of the matrix to generate extracted features.

44. The computer program product according to claim 37 wherein the clustering program code comprises:
   program code for applying a k-means clustering algorithm to the extracted features to generate one or more clusters each containing documents from the cluster.

45. The computer program product according to claim 37 further comprising:
   program code for calculating nearest neighbors between each document in a cluster and all other documents in the cluster.

46. The computer program product according to claim 37 further comprising:
   program code for selecting topic tokens for each of cluster from the tokens associated with the each cluster;
   program code for collecting all topic tokens into a list and eliminating duplicates;
   program code for modeling each cluster using a predetermined number of the remaining topic tokens; and
   program code for using a distance measure to identify related clusters.

* * * * *